United States Patent
Offerman (12)

(10) Patent No.: US 6,462,120 B2
(45) Date of Patent: Oct. 8, 2002

(54) AGRICULTURAL MULCH FILMS WITH TRIGGERED DEGRADATION

(75) Inventor: Ricky Joseph Offerman, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/534,727

(22) Filed: Mar. 24, 2000

(65) Prior Publication Data

US 2002/0132884 A1 Sep. 19, 2002

Related U.S. Application Data

(60) Provisional application No. 60/137,978, filed on Jun. 7, 1999.

(51) Int. Cl.[7] .............................. C08J 5/10; C08K 3/18; C08K 3/22; C08L 1/10
(52) U.S. Cl. ........................ 524/430; 524/425; 524/434
(58) Field of Search ................................ 524/430, 434, 524/425

(56) References Cited

U.S. PATENT DOCUMENTS

| | | | |
|---|---|---|---|
| 5,478,386 A | * 12/1995 | Itoh et al. ................ | 106/169 |
| 5,559,171 A | 9/1996 | Buchanan et al. | |
| 5,580,911 A | 12/1996 | Buchanan et al. | |
| 5,594,068 A | 1/1997 | Buchanan et al. | |
| 5,783,505 A | * 7/1998 | Duckett et al. ............ | 442/411 |

FOREIGN PATENT DOCUMENTS

| | | |
|---|---|---|
| DE | 296 19 016 U1 | 4/1998 |
| EP | 0 792 913 A2 | 9/1997 |
| EP | 0 597 479 B1 | 2/1998 |
| WO | WO 94/10238 A1 | 5/1994 |

OTHER PUBLICATIONS

C.M. Buchanan, Gardner and R.J. Komarek, "Aerobic Biodegradation of Cellulose Acetate" J. Applied Polymer Science, 1993, vol. 47, pp. 1709–1719, John Wiley & Sons, Inc.

R.J. Komarek, R.M. Gardner, C.M. Buchanan and S. Gedon, "Biodegradation of Radiolabeled Cellulose Acetate and Cellulose Propionate", J. Applied Polymer Science, 1993, vol. 50, pp. 1739–1746, John Wiley & Sons, Inc.

J.D. Gu, D. Eberiel, S.P. McCarthy, and R.A. Gross, "Degradation and Mineralization of Cellulose Acetate in Simulated Thermophilic Compost Environments", J. Environmental Polymer Degradation, 1993, vol. 1, pp. 281–291, Plenum Publishing Corp.

Canadian–US Business Consulting Service Clarkson University, "Agricultural Waste Market Research Study For New York State" May 14, (1996), parts 1 and 2.

M. H. Jensen and A. J. Malter, "Protected Agriculture, A Global Review" pp. 2–7, 10–15. (1995), The International Bank for Reconstruction and Development, Washington, D.C., USA.

R. M. Gardner, C. M. Buchanan, R Komarek, D. Dorschel, C. Boggs and A.W. White, "Compostability of Cellulose Acetate Films", J. Applied Polymer Science, vol. 52, pp. 1477–1488 (1994), John Wiley & Sons.

\* cited by examiner

Primary Examiner—James J. Seidleck
Assistant Examiner—U. K. Rajguru
(74) Attorney, Agent, or Firm—Betty J. Boshears; Bernard J. Graves, Jr.

(57) ABSTRACT

A process for enhancing biodegradability of a shaped article, includes the steps of providing a dimensionally stable shaped article; and contacting said article with a degradability triggering agent selected from the group consisting of chemical agents, enzymatic agents and biological agents selected from the group consisting of microbes and fungi. In a preferred embodiment the shaped article is an agricultural film that includes a cellulose ester having a degree of substitution greater than about 1.5.

11 Claims, No Drawings

AGRICULTURAL MULCH FILMS WITH TRIGGERED DEGRADATION

CROSS REFERENCE TO RELATED APPLICATIONS

Benefit is claimed to the earlier filed application having U.S. Serial No. 60/137,978 filed Jun. 7, 1999, the entire disclosure of which is incorporated herein by reference.

BACKGROUND OF THE INVENTION

1. Field of Invention

This invention relates to biodegradable films. Particularly, this invention relates to biodegradable films having agricultural applications and more particularly, agricultural biodegradable films that are subject to degradation after contacting a triggering composition. The present invention also concerns dimensionally stable shaped articles that are subject to degradation after contacting a triggering agent.

2. Background of Invention

Agricultural mulch films have been used in the production of fruit and vegetable crops for many years. The benefits of using these films include weed control, plant growth enhancement via solarization (warming) of the soil, extension of the growing season allowing for double and triple crops, reduction of pest infestation, efficient fumigation, moisture retention, improved irrigation efficiency, reduction in labor needed for crop production, increased crop output, enhanced crop quality, prevention of soil erosion, prevention of nutrient leaching and reduction in fruit rot by minimizing contact with soil.

In using an agricultural film, the farmer initially prepares the field by tilling the soil. A raised portion of the field, termed the field bed, is prepared and the agricultural mulch film is applied over the field bed and the edges of the film are sealed. The crop is planted by cutting holes in the film and planting the crop through these holes. Agricultural mulch film is often used in conjunction with irrigation systems either between the rows or under the film and often the soil is fumigated during the application of the film to reduce the infestation of pests. Growers will often plant a second or a third crop without removing the film to more efficiently utilize the film.

After harvesting the crop, the mulch film is removed in a very labor-intensive process. Typically, the plant mass is removed from the field either manually or by burning. The plastic is split and irrigation piping (if present) is removed. The mulch film is pulled from the ground, either by hand or mechanically, and collected for disposal.

This process has several disadvantages. Firstly, it is very labor intensive. Secondly, the disposal of the film can be problematic. Frequently, the film is contaminated with plant mass, dirt and possibly chemicals, such as, pesticides, herbicides and fertilizers. The weight of film removed from the field is often 25–200% of the initial weight of the film applied, and the volume of film removed is often 3–4 times the original volume of the film.

Other problems with the removed film are that it is often poor quality due to the film tearing during planting, harvesting and removal. Polyethylene film may also lack integrity due to photodegradation. These problems make reusing the film almost impossible.

There are few outlets for recovered material and little recycling of the material is carried out due to its contamination. In some areas, the removed material is legally prohibited from recycling streams due to the perception of contamination. In areas where recycling has been attempted the rejection rate for film is very high. For example, a Vermont study indicated that the rejection rate for recovered agricultural films is 70–90% after the users had cleaned the films and delivered them to the recycler.

Disposal of the film varies by region. Typically, the film is landfilled, either on site or in a commercial landfill, or burned. Landfill tipping fees can be high at commercial landfills, and there is a reluctance for landfills to accept used agricultural film due to the large bulk of the film after it is removed from the soil.

Numerous attempts have been made to develop degradable or biodegradable films suitable for agricultural applications. For example, U.S. Pat. Nos. 5,559,171 and 5,580,911 disclose a binary blend of cellulose esters and articles made therefrom. The blend includes (a) about 5% to about 98% of a C1–C10 ester of cellulose having a number of substituents per anhydroglucose unit of about 1.7 to 3.0 and an inherent viscosity of about 0.2 to about 3.0 deciliters/gram as measured at a temperature of 25° C. for a 0.5 g sample in 100 ml of a 60/40 parts by weight solution of phenol/tetrachloroethane, and (b) about 2% to about 95% of an aliphatic-aromatic copolyester having an inherent viscosity of about 0.2 to about 2.0 deciliters/gram as measured at a temperature of 25° C. for a 0.5 g sample in 100 ml of a 60/40 parts by weight solution of phenol/tetrachloroethane wherein the percentages are based on the sum of the weights of components (a) and (b).

As reported in Buchanan, (*J. Appl. Poly Science*, vol. 52, pp 1477–1488 (1994)), cellulose or cellulose derivatives with a low degree of substitution, i.e., less than one, are biodegradable at a relatively rapid rate. Cellulose is degraded in the environment by both anaerobic or aerobic microorganisms. Typical end products of this microbial degradation include cell biomass, methane (anaerobic only), carbon dioxide, water, and other fermentation products. The ultimate end products will depend upon the type of environment as well as the type of microbial population that is present. U.S. Pat. No. 5,580,911 discloses that the biodegradability of cellulose esters varies substantially with a degree of substitution. For example, cellulose esters having a degree of substitution of about 1.5 will exhibit a relatively fast rate of biodegradation while cellulose acetate having a degree of substitution as high as 2.5 can be degraded by certain microorganisms but the rate is slow. As used herein the term "degree of substitution" or "DS" refers to the number of substituents per anhydroglucose unit where the maximum degree of substitution is 3. As used herein, the term "biodegradable" refers to that type of degradability which is brought about by microorganisms and/or their enzymes when a substrate is exposed to the microorganisms under conditions which promote assimilation of the substrate by the microorganisms.

U.S. Pat. No. 5,594,068 discloses a biodegradable blend of cellulose esters. The blend includes from about 4 weight % to about 97 weight % of a C1–C10 cellulose ester having a DS of about 2.3 to about 3.0; from about 2 weight % to about 95 weight % of a second C1–C10 cellulose ester having a DS of about 1.5 to about 2.2; and from about 1 weight % to about 94 weight % of an aliphatic polyester or an aliphatic-aromatic polyester.

Presently, all degradable materials suffer from the same basic problem; weather has a substantial influence on the degradation rate. Since weather conditions are highly variable over time and locality this is a major problem in developing a material that will work consistently and particularly in agricultural applications. The weather may cause a material to decompose either too quickly or too slowly. For example, a hydrolytically degradable material may degrade too quickly if the crop season is wet but slowly or not at all if the crop season is dry and there is insufficient moisture to cause degradation. Similarly, a photodegradable material may decompose too quickly if the crop season is unusually sunny while a cloudy crop season may result in the material not decomposing. These complications have caused degradable mulch films to gain only small acceptance by the agricultural community.

Accordingly, there is a need for a biodegradable agricultural film that will retain its structural integrity independent of the weather conditions for a specified period of time with minimal or no degradation. There is also a need for a biodegradable agricultural film that can, at the desired time, be triggered to degrade.

SUMMARY OF THE INVENTION

Broadly, the present invention provides a process for enhancing biodegradability of a shaped article and more particularly a film. The process includes contacting a dimensionally stable shaped article with a biodegradability triggering agent. The biodegradability triggering agent is selected from chemical agents, enzymes, biological microbes and/or fungi, or combinations thereof.

It is an object of the present invention to provide a process wherein a polymeric material that would not degrade in the environment, or would do so only slowly, is triggered to begin degrading.

It is another object of the present invention to provide a process wherein a polymeric material that would not degrade in the environment, or would do so only slowly, is triggered to begin degrading by contacting the material with a chemical agent, an enzyme, biological microbes and fungi or combinations thereof.

Another object of the present invention is to provide a process for biodegrading a polymeric film that would not degrade in the environment, or would do so only slowly, is contacted with a triggering agent and the film remains on the surface of the soil or is tilled into the soil where it can completely decompose.

These and other objects and advantages of the present invention will become more apparent to those skilled in the art in view of the following description. It is to be understood that the inventive concept is not to be considered limited to the constructions disclosed herein but instead by the scope of the appended claims.

DETAILED DESCRIPTION OF THE INVENTION

In accordance with the present invention, an article, and preferably a polymeric article, that would not or only slowly degrade in the environment, is contacted with a triggering agent to promote degradation. The article such as a film, fiber, molded article or extruded article is contacted with a chemical, enzyme or biological material, such as microbe or fungi in order to trigger biodegradation. In a preferred embodiment the polymeric article is an agricultural film comprising a C1–C12 cellulose ester. Desirably, the triggering agent would reduce the degree of substitution of the cellulose ester sufficiently to allow the natural microbes in the soil to degrade the film. Triggered degradation, in its simplest form, is where the agricultural mulch film remains intact and useful for a period of time at least as long as would be necessary for the crop. After harvest, or whenever the user desires, the film is treated with the triggering agent initiating the degradation of the film and, after a prescribed waiting period, the film remnant is tilled into the soil to complete the decomposition by natural microbial action.

Triggered degradation has a number of advantages over both untriggered degradation where the film is left to degrade at a rate determined by the soil and weather conditions and non-biodegradable films that must be disposed of through land filling, burning or other disposal means. In triggered degradation, the degradation is initiated on a discretionary basis by treatment of the material with chemical, enzymatic or microbial agents. The timing of degradation is subject to the discretion of the user and not dependent on the weather or soil conditions. The degradation of the film in place eliminates the labor required to remove the film from the field, thus reducing the cost for the user. Since the film degrades in the field, the labor required for transporting the material for off-site disposal and the cost of disposal are also eliminated.

Another advantage of the present invention is that a single film product can be used for all applications in which the user desires a degradable film since it is the user, rather than environmental conditions, who decides when the film decomposes. An added benefit of triggered degradation is that upon decomposition the film adds materials back to the soil that are beneficial to the soil. Alternatively, additives can be incorporated into the film that would enhance soil quality (such as trace minerals or fertilizers) upon their release or even materials such as pesticides or herbicides.

Non-limiting examples of polymeric materials suitable for the practice of this invention include polymers, copolymers and mixtures thereof of: poly(caprolactone); polyanhydrides, e.g., poly(sebacic anhydride), poly(valeric anhydride), poly(trimethylene carbonate), and copolymers such as poly(carboxyphenoxypropane-sebacic acid), and poly(fumaric acid-sebacic acid); polyorthoesters; polyurethane; polyanhydrides; polyglutamates; polyhydroxy butyrates; polyesters; polysaccharide esters; cellulosic esters; starch esters; polyamides, poly(hydroxybutyrate), poly(hydroxyvalerate), and poly(lactic acid).

In a preferred embodiment, the polymeric material includes a cellulose ester having up to ten carbon atoms and preferably at least 2 anhydroglucose rings. Preferably, the cellulose ester has between 2 and 5,000 anhydroglucose rings. Typically, such polymers have an inherent viscosity (I.V.) of about 0.2 to about 3.0 deciliters/gram, preferably about 1 to about 1.6, as measured at a temperature of 25° C. for a 0.5 gram sample in 100 mL of a 60/40 by weight solution of phenol/tetrachloroethane. The DS/AGU of the cellulose esters useful herein is greater than about 1.5, preferably from about 2.0 to 3, more preferably from about 2.3 to 3 and most preferably from about 2.5 to 3. Preferred cellulose esters include cellulose acetate, cellulose acetate phthalate, cellulose acetate butyrate, cellulose butyrate, cellulose propionate, cellulose acetate propionate, cellulose propionate butyrate, carboxymethylcellulose acetate, carboxymethylcellulose acetate propionate, carboxymethylcellulose acetate butyrate, cellulose acetate butyrate succinate, cellulose nitrate and mixtures thereof. Most preferably, the cellulose ester is cellulose acetate, cellulose acetate propionate, or a mixture thereof.

The polymeric material may further include blends of cellulose esters with aliphatic polyesters and/or aliphatic-aromatic copolyesters and may also include from about 1 weight % to 50 weight %, based on the total weight of the composition, of an additive selected from a thermal stabilizer, an antioxidant, a pro-oxidant, an acid scavenger, an ultraviolet light stabilizer, a promoter of photodegradation, inorganics, and colorants. Preferred aliphatic polyesters include, polyhydroxybutyrate, a copolymer of polyhydroxybutyrate and polyhydroxyvalerate, poly (hexamethylene glutarate), poly(hexamethylene adipate), poly(ethylene sebacate), poly(tetramethylene glutarate), poly(tetramethylene adipate), poly(tetramethylene sebacate), poly(ethylene glutarate), poly(ethylene succinate), poly(tetramethylene succinate), or poly(ethylene adipate). Examples of useful stabilizing agents include, but are not limited to, potassium dihydrogen citrate, sodium citrate, calcium citrate, sodium lactate, calcium lactate, sodium oxalate, calcium acetate, calcium propionate and sodium malate. Representative inorganics include talc, $TiO_2$, $CaCO_3$, $NH_4Cl$, and silica. Colorants can be monomeric, oligomeric, and, of course, polymeric. Other additives include microcrystalline cellulose, cellulose monoacetate, starch and other carbohydrates. These blends and additives are described in greater detain in U.S. Pat. No. 5,559,171 the disclosure of which is incorporated herein by reference.

Optionally, the polymeric material may include plasticizers known to those skilled in the polymer art. Examples of suitable plasticizers include: dioctyl adipate, triethylene glycol-2-ethylhexanoate, polyethylene glutarate, dioctyl phthalate, glycerol diacetate and triacetate, diethyl phthalate, butyl benzyl phthalate, diethyl and triethyl citrate, acetyl triethyl citrate, tripropionin, polypropylene glycol dibenzoate, polyethylene succinate, sucrose acetate isobutyrate, triphenyl phosphate, polyalkyl glycoside, triethyl phosphate, diethyl phthalate, 2,2,4-trimethyl-1,3-pentane-diol diisobutyrate, a copolymer of phthalic acid, 1,3-butanediol, and 1,4-butanediol end capped by aliphatic epoxide, or a mixture thereof. The preferred plasticizer is one which exhibits low water solubility so that it will not be washed from the film by rain or irrigation and is either decomposed by the triggering agent and then biodegraded or degraded as it is released from the film.

In the case where the shaped article is an agricultural mulch film, the film may also contain additives that are adapted to be released into the soil as the film degrades. Such agricultural additives include insecticides, herbicides, pesticides, fertilizers, trace minerals, and a mixture thereof.

The triggering agent desirably is matched closely to the components of the film, such as the type of polymer, filler, additive, stabilizer, plasticizer or other component, so that the triggering agent needs minimal contact time to cause or initiate the loss of integrity of the film. The contact time preferably is less than one week, more preferably less than 2 days and most preferably less than 12 hours. The triggering agent is preferably one that can be easily handled by the user either in solid, liquid or gaseous form or may be prepared by the user immediately prior to use. The triggering agents used in the degradation of the films include chemical agents, enzymatic agents, microbial agents and combinations thereof. Chemical triggers may include alkaline chemicals such as metal oxides, metal hydroxides, agricultural lime, amines or mixtures thereof and acidic materials such as mineral acids or organic acids and combinations thereof. Enzymatic triggers include hydrolases including esterases, lipases, cellulases and combinations thereof. Biological triggers include microbes, bacteria, fungi, spores or combinations, thereof. Combinations of the aforementioned chemical, enzymatic and biological triggers may be employed with synergistic effects. In a preferred embodiment, the triggering agent is any one of a number of chemicals already used in agricultural applications including such as fertilizers, or other soil nutrients, or soil treatments such as agricultural lime.

Suitable triggering agents for polymers that do not degrade or do so only very slowly can be designed to target specific chemical functionality present in the polymer, causing the polymer to degrade into materials that would naturally biodegrade in the environment. For example, a triggering agent could be applied to an aliphatic polyester film, such as polyethylene succinate, that would cause hydrolysis of the ester linkages and chain cleavage to form aliphatic carboxylic acids and aliphatic alcohols that are biodegradable. This would be useful in reducing litter from articles prepared from that material. This would be especially useful in degrading objects that are quite large, bulky or otherwise difficult to manipulate. In agricultural applications, for example, manufactured articles such as silage bags are typically quite large (30 feet wide by 20 feet tall by hundreds of feet long) and can weigh several hundred pounds. After use, the product is contaminated with plant mass, which increases the weight even more. Physical handling of an object of this size can prove to be difficult. A more convenient and labor saving solution is to treat the object in place with a triggering agent after it has completed its useful life. The object could then degrade in place by microbial action.

Likewise, polymeric films containing amide, carbamate or carbonate functional groups would be degraded by triggering the hydrolysis of those functionalities. This would result in chain scission and a loss of integrity of the polymer. Polymers containing labile protons (such as allylic or benzylic protons) might be attacked by oxidizing agents which could introduce an oxygen functionality into the polymer which could lead to chain scission and loss of polymer integrity.

In the case where the shaped article is an agricultural mulch film made of cellulose esters or blends of cellulose esters and other components, the cellulose ester component of the film should be of a high enough DS, preferably about 2.4 to 3, that it would naturally decompose only at a very slow rate in the environment. Treatment with a triggering agent may cause degradation of the film by means of: 1) de-esterification of the cellulose ester; 2) decomposition or removal of the plasticizer; 3) a reduction in the molecular weight of the cellulosic chain; 4) decomposition or removal of the stabilizer; and/or 5) decomposition or removal of a filler material present in the film.

The triggering agent may include additives for facilitating the penetration of the triggering agent into the film. Alternatively, or in addition, the triggering agent may make intimate contact with the polymer to promote degradation. The triggering agent may also contain components, which make the triggering agent tacky upon contact with the film so that the triggering agent adheres to the surface of the film, does not easily wash off and remains in intimate contact with the film. The solid particle may also be coated with a substance that may cause it to adhere to the surface of the film and cause it to remain in intimate contact with the film. The particles may also be of a shape that allows them to remain in intimate contact with the film.

The triggering agent may be applied to the shaped article by any means which would provide intimate contact between the polymeric material and the triggering agent. For example, the triggering agent can be applied to the article by dipping or immersing the article in a bath containing the triggering agent; or spreading the triggering agent in the form of a paste, slurry or solid particle over the article; or spraying of a liquid solution or emulsion of the triggering agent upon the film. The triggering agent may also be delivered through an irrigation system either via spraying or introduction under the film in what is known as trickle irrigation or on top of the film by irrigation systems or using farm implements.

Methods for preparing such shaped articles are well known in the polymer arts and include such methods as die casting, molding, extrusion, film casting and combinations thereof. Films may also be prepared using standard papermaking and laminating techniques where a combination of materials are combined to provide a desired film or product.

Another application of the present invention is in the production of articles produced from biodegradable materials which have been treated with an additive material that inhibits the degradation of the article. This additive material could be blended with polymeric material prior to molding or extrusion or coated onto the exposed surface of the completed article. This would increase the lifetime of the article. When the user desired, the article could be treated with a triggering agent that would decompose the additive, thus allowing for the degradation of the polymer component of the article. For example, a polymer that is degraded by the action of sunlight could be treated with an additive (i.e. an UV inhibitor) that would block this effect. When the user desired, the article could be treated with an agent that would decompose the inhibitor and allow the article to decompose.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise described.

EXAMPLE 1

Eight samples were prepared from cellulose acetate having a DS of 2.5 and approximately 17 weight % diethyl phthalate as a plasticizer. Each sample was weighed, dimensionally measured and contacted with a triggering agent for the time period specified below. Afterwards, the film samples were washed with water and then allowed to air dry. The film samples were again weighed and dimensionally measured to determine the changes. The contacting solution was analyzed using infrared reflectance to determine if the plasticizer remained on the sample and to determine if acetyl groups were still present in the film samples. The data is summarized in Table I below.

TABLE I

| Sample | Film Dimension | Triggering Agent and weight (g) | Contact Time (hrs) | Starting and ending weights (g) | weight % loss | weight % loss as % of original acetyl |
|---|---|---|---|---|---|---|
| 1 | 7.5 × 10.25 | none | 36.5 | 2.60 | 2.7 | 5.8 |
| 1a | 7.5 × 10.25 | 0.0 | | 2.53 | | |
| 2 | 7.25 × 10.5 | CaO | 36.8 | 2.69 | 11.5 | 24.8 |
| 2a | 7.25 × 10.5 | 0.22 | | 2.38 | | |
| 3 | 10.75 × 7.6 | CaO | 34.5 | 2.64 | 31.1 | 66.8 |
| 3a | 8.5 × 5.5 | 0.66 | | 1.82 | | |
| 4 | 10.9 × 7.7 | CaO | 34.3 | 2.77 | 40.4 | 87.0 |
| 4a | 8.0 × 5.0 | 1.70 | | 1.65 | | |
| 5 | 7.5 × 10.25 | CaO | 36.5 | 2.60 | 41.9 | 90.2 |
| 5a | 4.75 × 7.75 | 3.45 | | 1.51 | | |
| 6 | 7.5 × 10.25 | CaO | 37.0 | 2.59 | 38.2 | 82.2 |
| 6a | 5.5 × 7.5 | 28.32 | | 1.6 | | |
| 7 | 7.9 × 10.8 | $NH_4NO_3$ | 36.0 | 2.78 | 2.5 | 5.4 |
| 7a | 7.8 × 10.8 | 0.72 | | 2.71 | | |
| 8 | 7.5 × 10.5 | $CH_3CO_2H$ | 36.5 | 2.60 | 2.7 | 5.8 |
| 8a | 7.5 × 10.5 | 0.48 | | 2.53 | | |

In the table, the "a" portion of the sample represents the "after contact" film dimension and weight.

Desirably, the triggered biodegradable materials, such as the preferred films of this invention, are materials that are comprised of components which, when contacted with the triggering agent and desirably in combination with naturally occurring microbial degradation, are reduced in film strength by reduction in polymer size to monomers or short chains which are then assimilated by the microbes. In an aerobic environment, these monomers or short chains are ultimately oxidized to $CO_2$, $H_2O$, and new cell biomass. In an anaerobic environment the monomers or short chains are ultimately oxidized to $CO_2$, $H_2O$, acetate, methane, and cell biomass. Successful biodegradation requires that direct physical contact must be established between the biodegradable material, the triggering agent and the active microbial population or the enzymes produced by the active microbial population. An active microbial population useful for degrading the films and blends of the invention can generally be obtained from any municipal or industrial wastewater treatment facility in which the influents (waste stream) are high in cellulose materials.

These results indicate that composition of the film was dramatically altered when in contact with the triggering solution. The plasticizer was removed from the film and cellulose acetate was at least partially deacetylated. The treatment of the cellulose acetate film in this manner was highly successful in lowering the degree of substitution of the cellulose acetate and removing the plasticizer from the film. The amount of the triggering agent used did have an effect on the degradation of the film. When a small amount of CaO was employed (Sample 2), the film exhibited significant weight loss but not to the extent seen when higher levels were employed (Samples 3–5). Using a large excess of the triggering agent (Sample 7) was not beneficial in reducing the weight of the film.

However, when samples of the same film were contacted with solutions containing low levels of acetic acid and ammonium nitrate, the amount of degradation of the film, as evidenced by the weight loss in the film, was comparable to the weight loss seen when the film was contacted only with water and no triggering agent was used.

EXAMPLE 2

Five samples were prepared from a thermally extruded film of cellulose acetate having a DS of about 2.47 (determined by 1H NMR). The film had a dimension of about 8 inches×10 inches (20.3 cm×25.4 cm) and a weight of approximately 2.5 g. The cellulose acetate contained 16.7 weight % (by 1 H NMR) of diethyl phthalate (DEP) as a plasticizer. Each film sample was placed in a container with a solution having the specified amount of triggering agent dissolved in approximately 250 mL of water. The film was contacted with the aqueous solution at ambient temperature, approximately 25° C., for the specified period of time. At the end of the time period, the film was removed from the solution and thoroughly rinsed with distilled water. The pH of the residual solution was measured and recorded. The film was dried, weighed, and the dimensions re-measured. The results are set forth in Table II below.

TABLE II

| Triggering Agent | Amount (g/g film) | Time (h) | Final pH | Film Wt Loss (g) | Film Wt Loss (%) |
|---|---|---|---|---|---|
| None | 0.00 | 36.5 | 5.5–6 | 0.07 | 2.7 |
| CaO | 1.33 | 36.5 | 13 | 1.09 | 41.9 |
| $NH_4NO_3$ | 0.26 | 36.0 | 7 | 0.07 | 2.5 |
| $CH_3CO_2H$ | 0.18 | 36.5 | 3 | 0.07 | 2.7 |
| $CaCO_3$ | 6.90 | 34.0 | 6 | 0.06 | 2.2 |

From the above, it is clear that calcium oxide is a particularly effective triggering agent. Calcium oxide catalyzed extensive hydrolytic degradation of the cellulose acetate and/or plasticizer. It also caused considerable shrinkage of the film (down to 5"×8" size in the case of CaO), which would tend to stress and tear the film in the field.

EXAMPLE 3

Six samples of film similar to that described in Example 2 were prepared having a dimension of about 8 inches×10 inches (20.3 cm×25.4 cm) and a weight of approximately 2.5 g. Each film sample was placed in a container with a solution having the specified amount of triggering agent dissolved in approximately 250 mL of water. The film was contacted with the aqueous solution at ambient temperature, approximately 25° C., for the specified period of time. At the end of the time period, the film was removed from the solution and thoroughly rinsed with distilled water. The pH of the residual solution was measured and recorded. The film was dried, weighed, and the dimensions re-measured. The results are set forth in Table III below.

TABLE III

| Triggering Agent | Amount (g/g film) | Time (h) | Final Solution pH | Film Wt Loss (g) | Film Wt Loss (%) |
|---|---|---|---|---|---|
| None | 0.00 | 36.5 | 6 | 0.07 | 2.7 |
| CaO | 0.08 | 36.8 | 13 | 0.31 | 11.5 |
| CaO | 0.25 | 34.5 | 10 | 0.82 | 31.1 |
| CaO | 0.61 | 34.3 | 12 | 1.12 | 40.4 |
| CaO | 1.33 | 36.5 | 13 | 1.09 | 41.9 |
| CaO | 10.93 | 37.0 | 13 | 0.99 | 38.2 |

This example shows that the magnitude of film degradation can be controlled by the amount of calcium oxide added as a triggering agent. Higher amounts of calcium oxide gave higher amounts of film degradation.

EXAMPLE 4

Another 8 inch×10 inch (20.3 cm×25.4 cm) sample of cellulose acetate film described above in Example 2 was placed in a container with a solution having 1.33 g/g of film weight of CaO dissolved in approximately 250 mL of water. The film was contacted with the aqueous solution at ambient temperature, approximately 25° C. At the specified times, solution aliquots were removed and analyzed for liberated acetic acid using titration. The pH solution remained at 12 throughout the time period. The percent of the starting acetyl removed was calculated using the known starting weight, plasticizer content, and DS of the film. The results are in Table IV below.

TABLE IV

| Time (h) | % Acetic Acid in Liquid | % Starting Acetyl Removed |
|---|---|---|
| 0.0 | — | — |
| 12.0 | 0.357 | 73.8 |
| 23.0 | 0.479 | 99.0 |
| 36.5 | 0.478 | 98.8 |

This example shows that CaO can be used to trigger essentially complete hydrolysis of the acetyl at ambient temperature at an acceptable rate, with the hydrolysis essentially complete after about 23 hours.

EXAMPLE 5

Another 8 inch×10 inch (20.3 cm×25.4 cm) sample of the film described in Example 2 above was placed in a glass pan with a solution containing 3.45 g calcium oxide, dissolved in 249 g water. The film was contacted with the aqueous solution at ambient temperature, approximately 25° C., for a total of 36.5 hours. At the end of the 36.5 hours, the film was removed from the solution and thoroughly rinsed with distilled water. An aliquot of the residual solution was removed to measure liberated acetic acid i.e. the reduction in DS using titration analysis. The film was dried, then weighed, and its dimensions re-measured. The film then was analyzed by infrared spectroscopy. The results are set forth in Table V below.

TABLE V

| Time (h) | Film Wt Loss | DS Loss | DEP by IR | Film Size |
|---|---|---|---|---|
| 0 | | | | 8" × 10" |
| 36.5 | 42% | 99% | None | 5" × 8" |

This example shows that the triggering agent hydrolyzed and removed the plasticizer, and hydrolyzed the cellulose ester down to a very low degree of substitution. It also caused considerable shrinkage of the film. Typically, such shrinkage would tend to stress and tear the film in the field thereby reducing the size and integrity of the film.

EXAMPLE 6

A number of cellulose acetate films having a DS of 1.85, 2.0 and 2.5 were synthesized from $^{14}C$-labeled acetate and subjected to a composting environment. The degradation of the material was monitored by the release of $^{14}CO_2$ produced and was used as an indicator of the ester linkages. The results are set forth in Table 6 below.

TABLE VI

| Time | % Mineralization | | |
|---|---|---|---|
| (h) | DS 1.85 | DS 2.0 | DS 2.5 |
| 0 | 0 | 0 | 0 |
| 48 | 22 | 15 | 5 |
| 96 | 58 | 38 | 19 |
| 144 | 74 | 49 | 21 |
| 192 | 79 | 57 | 27 |
| 240 | 81 | 63 | 33 |
| 288 | 82 | 66 | 38 |
| 336 | 83 | 69 | 41 |

This example shows the gradation of cellulose acetate with a DS of 1.85, as evidence by the production of $^{14}CO_2$ is rapid with the majority of the degrading occurring within one week. Cellulose acetate with higher degrees of substitution require much longer periods of time to degrade. For example, cellulose acetate with a DS of 2.5 remains only partially degraded after 2 weeks.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents.

What is claimed is:

1. A process for enhancing biodegradability of a shaped article, said process comprising:
   a. providing a dimensionally stable shaped article; and
   b. contacting said article with a degradability triggering agent selected from the group consisting of metal oxides, metal hydroxides, agricultural lime, amines, metal carbonates, metal carboxylates and combinations thereof, wherein said shaped article comprises a cellulose ester having a degree of substitution of from about 2.3 to about 3 and wherein said article has at least about 10% weight loss within 48 hours after said contact with said degradability triggering agent.

2. The process of claim 1 wherein said article is selected from the group consisting of a film, a fiber, a molded object and an extruded object.

3. The process of claim 2 wherein said article comprises a film.

4. The process of claim 1 further comprises from about 1 weight % to about 50 weight % of an additive selected from the group consisting of a stabilizer, an antioxidant, a pro-oxidant, an acid scavenger, an ultraviolet light stabilizer, a promoter of photodegradation, an inorganic, and a colorant.

5. The process of claim 1 wherein said cellulose ester is selected from the group consisting of cellulose acetate, cellulose propionate, cellulose butyrate, cellulose acetate propionate, cellulose acetate butyrate, and cellulose propionate butyrate.

6. The process of claim 5 wherein said cellulose ester propionate butyrate.

7. The process of claim 1 wherein said dimensionally stable shaped article includes a polymeric material selected from the group consisting of poly(caprolactone), poly(lactic acid), polyanhydrides, selected from the group consisting of poly(sebacic anhydride) and poly(valeric anhydride), poly(trimethylene carbonate), polyesters, polyorthoesters, polysaccharide esters, polyurethane, polyglutamates, polyhydroxy butyrates, polyamides, poly(hydroxyvalerate), cellulosic esters, starch esters, and copolymers selected from the group consisting of poly(carboxyphenoxypropane-sebacic acid) and poly(fumaric acid-sebacic).

8. A process for enhancing biodegradability of a polymeric film, said process comprising:
   a. providing a dimensionally stable film comprising a polymeric material selected from the group consisting of poly(caprolactone), poly(lactic acid), polyanhydrides, selected from the group consisting of poly(sebacic anhydride) and poly(valeric anhydride), poly(trimethylene carbonate), polyesters, polyorthoesters, polysaccharide esters, polyurethane, polyglutamates, polyhydroxy butyrates, polyamides, poly(hydroxyvalerate), cellulosic esters, starch esters, and copolymers selected from the group consisting of poly(carboxyphenoxypropane-sebacic acid) and poly(fumaric acid-sebacic); and
   b. contacting said film with a degradability triggering agent selected from the group consisting of metal oxides, metal hydroxides, agricultural lime, amines, metal carbonates, metal carboxylates and combinations thereof, wherein said cellulose ester has a degree of substitution of from about 2.5 to about 3 and wherein said article has at least about 10% weight loss within 48 hours after said contact with said degradability triggering agent.

9. The process of claim 8 wherein said cellulose ester is selected from the group consisting of cellulose acetate, cellulose propionate, cellulose butyrate, cellulose acetate propionate, cellulose acetate butyrate, and cellulose propionate butyrate.

10. A process for enhancing biodegradability of a polymeric film, said process comprising:
    a. providing a dimensionally stable film comprising a cellulose ester having a degree of substitution of from about 2.5 to about 3; and
    b. contacting said film with a degradability triggering agent selected from the group consisting of metal oxides, metal hydroxides, agricultural lime, amines, metal carbonates, metal carboxylates and combinations thereof, and wherein said article has at least about 10% weight loss within 48 hours after said contact with said degradability triggering agent.

11. The process of claim 10 wherein said cellulose ester is selected from the group consisting of cellulose acetate, cellulose propionate, cellulose butyrate, cellulose acetate propionate, cellulose acetate butyrate, and cellulose propionate butyrate.

* * * * *

UNITED STATES PATENT AND TRADEMARK OFFICE
CERTIFICATE OF CORRECTION

PATENT NO.   : 6,462,120 B2
DATED        : October 8, 2002
INVENTOR(S)  : Ricky Joseph Offerman It is certified that error appears in the above-identified patent and that said Letters Patent is hereby corrected as shown below:

Column 11,
Line 15, "gradation" should read -- degradation --.
Lines 60 and 61, Claim 6 should read -- The process of claim 5 wherein said cellulose ester is cellulose acetate propionate --.

Signed and Sealed this

Twenty-fourth Day of December, 2002

JAMES E. ROGAN
*Director of the United States Patent and Trademark Office*